(12) United States Patent
Wollach

(10) Patent No.: US 8,573,440 B2
(45) Date of Patent: Nov. 5, 2013

(54) METERED DISPENSER AND METHOD OF DISPENSING A MEASURED AMOUNT OF A SUBSTANCE

(76) Inventor: Larry Anthony Wollach, Hamilton, VA (US)

( * ) Notice: Subject to any disclaimer, the term of this patent is extended or adjusted under 35 U.S.C. 154(b) by 156 days.

(21) Appl. No.: 13/079,319

(22) Filed: Apr. 4, 2011

(65) Prior Publication Data

US 2012/0248138 A1    Oct. 4, 2012

(51) Int. Cl.
*G01F 11/28* (2006.01)

(52) U.S. Cl.
USPC .................................. 222/1; 222/23; 222/438

(58) Field of Classification Search
USPC ......... 222/163, 286, 304, 306, 440, 309, 438, 222/129.4, 133, 168.5, 298
See application file for complete search history.

(56) References Cited

U.S. PATENT DOCUMENTS

| | | | |
|---|---|---|---|
| 2,148,335 A | 2/1939 | Arola | |
| 2,248,958 A * | 7/1941 | Christensen et al. | 222/442 |
| 2,428,233 A * | 9/1947 | Livadas | 222/455 |
| 2,532,787 A | 12/1950 | Romyns | |
| 3,020,938 A * | 2/1962 | Ballin | 141/24 |
| 3,101,751 A * | 8/1963 | Ballin | 141/24 |
| 3,224,652 A | 12/1965 | Ladwig et al. | |
| 3,243,086 A * | 3/1966 | Dousette | 222/447 |
| 3,451,446 A | 6/1969 | Russell | |
| 3,940,027 A | 2/1976 | Marterer | |
| 4,073,192 A | 2/1978 | Townsend | |
| 4,074,831 A * | 2/1978 | Roach | 222/43 |
| 4,211,346 A | 7/1980 | Mehra et al. | |
| 4,273,257 A * | 6/1981 | Smith et al. | 222/43 |
| 4,350,265 A | 9/1982 | Griffiths et al. | |
| 4,821,930 A * | 4/1989 | Luine et al. | 222/454 |
| 5,092,497 A | 3/1992 | Toedter | |
| 5,186,367 A * | 2/1993 | Hickerson | 222/207 |
| 5,259,536 A * | 11/1993 | Reyman | 222/207 |
| 5,292,039 A | 3/1994 | Neofitou | |
| 5,524,795 A | 6/1996 | Lee | |
| 6,164,498 A * | 12/2000 | Faughey et al. | 222/309 |
| 6,227,418 B1 * | 5/2001 | Loertscher | 222/438 |
| 6,330,960 B1 * | 12/2001 | Faughey et al. | 222/205 |
| 6,394,317 B1 * | 5/2002 | Faughey et al. | 222/309 |
| 6,443,331 B1 * | 9/2002 | DeJonge | 222/153.13 |
| 6,481,596 B1 * | 11/2002 | Rusnak | 222/1 |
| 6,702,155 B1 * | 3/2004 | Rebne | 222/207 |
| 7,959,031 B2 * | 6/2011 | Ranney | 222/1 |
| 2005/0150907 A1 * | 7/2005 | Chien | 222/157 |

* cited by examiner

*Primary Examiner* — Kevin P Shaver
*Assistant Examiner* — Christopher Luzecky
(74) *Attorney, Agent, or Firm* — Sherr & Jiang, PLLC

(57) ABSTRACT

A dispensing method and dispenser that dispenses a measured amount of a substance from a container are provided. The dispenser includes a measuring chamber having an adjustable volume, and a conduit section that adjusts the volume of the measuring chamber by moving a plunger that forms a wall of the measuring chamber. The substance is poured into the measuring chamber from the container through a valve, and the valve closes to seal the substance within the measuring chamber. The plunger may include a spout through which the substance is dispensed when the plunger is driven by the conduit section into the measuring chamber to reduce the volume of the measuring chamber.

18 Claims, 7 Drawing Sheets

METERED DISPENSER AND METHOD OF DISPENSING A MEASURED AMOUNT OF A SUBSTANCE

BACKGROUND OF THE INVENTION

1. Field of the Invention

Apparatuses and methods consistent with the present invention relate to a metered dispenser and a method of dispensing a measured amount of a substance, and more particularly, to a dispenser having a measuring chamber that collects a desired amount of a substance prior to dispensing, and a method thereof.

2. Description of the Related Art

Many different types of substances on the market today are dispensed from a bottle or container. When dispensed, one usually has to unscrew or remove a cap of the bottle or container and pour out a desired amount.

However, the quantity that is actually poured from the bottle or container can only be estimated and is very inexact, and there is needed a more precise way of measuring and dispensing a specifically desired quantity.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Aspects of the present invention relate to a dispenser that dispenses a measured amount of a substance from a container, and a dispensing method thereof.

According to an exemplary embodiment of the present invention, there is provided a dispenser for dispensing a substance, the dispenser including: a measuring chamber having an adjustable volume for receiving the substance substantially in a predetermined amount through a valve; and a conduit section that adjusts the volume of the measuring chamber by moving a plunger that forms a wall of the measuring chamber, wherein the valve can selectively seal the substance within the measuring chamber, and the plunger includes a spout through which the substance can be dispensed as the plunger is moved by the conduit section into the measuring chamber to reduce the volume of the measuring chamber.

The valve can be closed by rotating the measuring chamber relative to a container from which the substance is received.

The rotation of the conduit section relative to the measuring chamber may change a position of the plunger which in turn changes the volume of the measuring chamber.

According to another exemplary embodiment of the present invention, there is provided a dispenser including: a first conduit section having a first end for coupling to an opening of a container; a second conduit section having a first end for coupling to a second end of the first conduit section, the second conduit section having a measuring chamber for receiving a predetermined amount of a substance from the container; a valve that controls a flow of the substance between the container and the measuring chamber; and a third conduit section for coupling to a second end of the second conduit section, wherein a volume of the measuring chamber is adjusted by changing a depth of penetration of a plunger of the third conduit section into the second conduit section.

The depth of penetration of the plunger can be changed by rotating the third conduit section relative to the second conduit section.

The valve can be selectively opened or closed by rotating the second conduit section relative to the first conduit section.

The valve may include a first disc and a second disc, the second disc being concentric with and stacked upon the first disc, and each of the first disc and the second disc having a cutout portion, wherein the valve can be closed when the first disc is rotated to a position in which a non-cutout portion of the first disc overlaps and covers the cutout portion of the second disc to form a barrier seal.

The third conduit section may include a spout through which the substance contained in the measuring chamber is dispensed. The substance may be dispensed from the measuring chamber through the spout as the volume of the measuring chamber is reduced by the plunger.

The substance can be dispensed from the measuring chamber through an opening of the third conduit section after a hatch that selectively covers the opening is displaced from the opening.

According to another exemplary embodiment of the present invention, there is provided a method of dispensing a measured amount of a substance from a container, the method including: adjusting a volume of a measuring chamber to a desired volume; filling the measuring chamber with the substance; closing a valve to prevent flow of the substance into and out from the measuring chamber; and dispensing the substance from the measuring chamber.

The substance can be dispensed from the measuring chamber by forcing the substance through a spout. More particularly, the dispensing of the substance from the measuring chamber may include: reducing the volume of the measuring chamber with a plunger; and forcing the substance to dispense from the measuring chamber through a spout passing through the plunger.

The volume of the measuring chamber may be reduced by moving the plunger toward the valve.

The substance may also be dispensed from the measuring chamber by opening a hatch of the measuring chamber and releasing the substance through the opened hatch.

The closing of the valve may include rotating a disc of the valve to a position that seals an opening in the valve between the measuring chamber and the container. The disc may be rotated by rotating the measuring chamber relative to the container.

The rotation of the measuring chamber relative to the container may effectuate a rotation of a first disc of the valve relative to a second disc of the valve, the second disc being concentric with and stacked upon the first disc, and each of the first disc and the second disc having a cutout portion, wherein the valve may be closed when a non-cutout portion of the first disc overlaps and covers the cutout portion of the second disc to form a barrier seal.

BRIEF DESCRIPTION OF THE DRAWINGS

The above and/or other aspects of the invention will become apparent and more readily appreciated from the following description of exemplary embodiments, taken in conjunction with the accompanying drawings, of which.

DETAILED DESCRIPTION OF EXEMPLARY EMBODIMENTS OF THE PRESENT INVENTION

Figure 1:
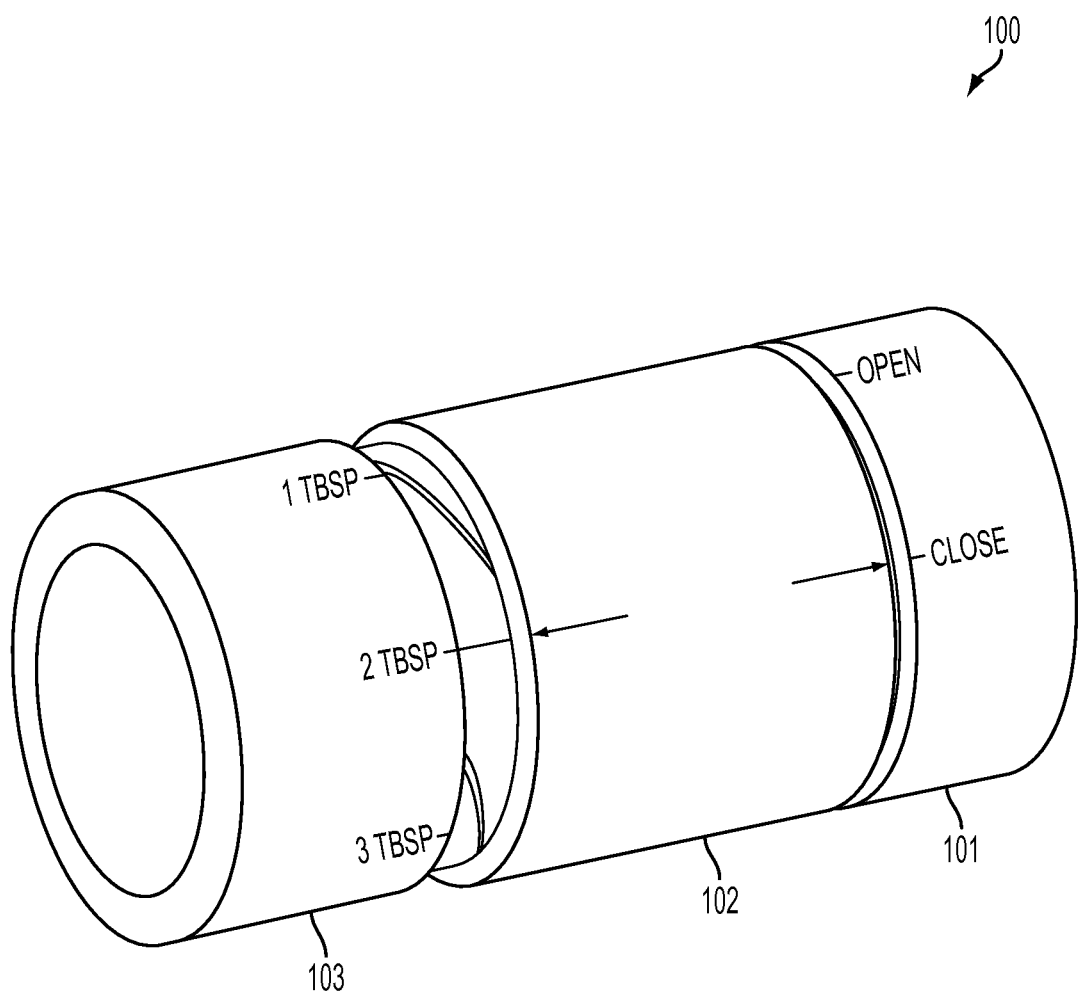
FIG. 1 is a view of a dispenser, according to an exemplary embodiment of the present invention.

Reference will now be made in detail to exemplary embodiments of the present invention, examples of which are illustrated in the accompanying drawings, wherein like reference numerals refer to like elements throughout. Exemplary embodiments are described below, in order to explain the present invention by referring to the figures.

FIG. 1 is a view of a dispenser (100), according to an exemplary embodiment of the present invention. As shown in FIG. 1, the dispenser (100) includes a first conduit section (101) coupled to a second conduit section (102). The second conduit section (102) includes a measuring chamber into which a substance is provided prior to dispensing. The measuring chamber receives the substance through an opening at a top end. The opening of the measuring chamber may be sealed by closing a valve (306) (shown in FIGS. 3, 8 and 9). The volume of the measuring chamber may be adjustable to allow for the dispenser (100) to selectively dispense a desired quantity of the substance.

The dispenser (100) also includes a third conduit section (103) coupled to the second conduit section (102). In an exemplary embodiment of the present invention, the volume of the measuring chamber of the second conduit section (102) may be adjusted by changing the penetration depth into the second conduit section (102) by portions of the third conduit section (103). For example, the second conduit section (102) may be coupled to the third conduit section (103) via threading such that the volume of the measuring chamber of the second conduit section (102) can be adjusted by screwing in or screwing out the third conduit section (103) from the second conduit section (102).

Figure 2:
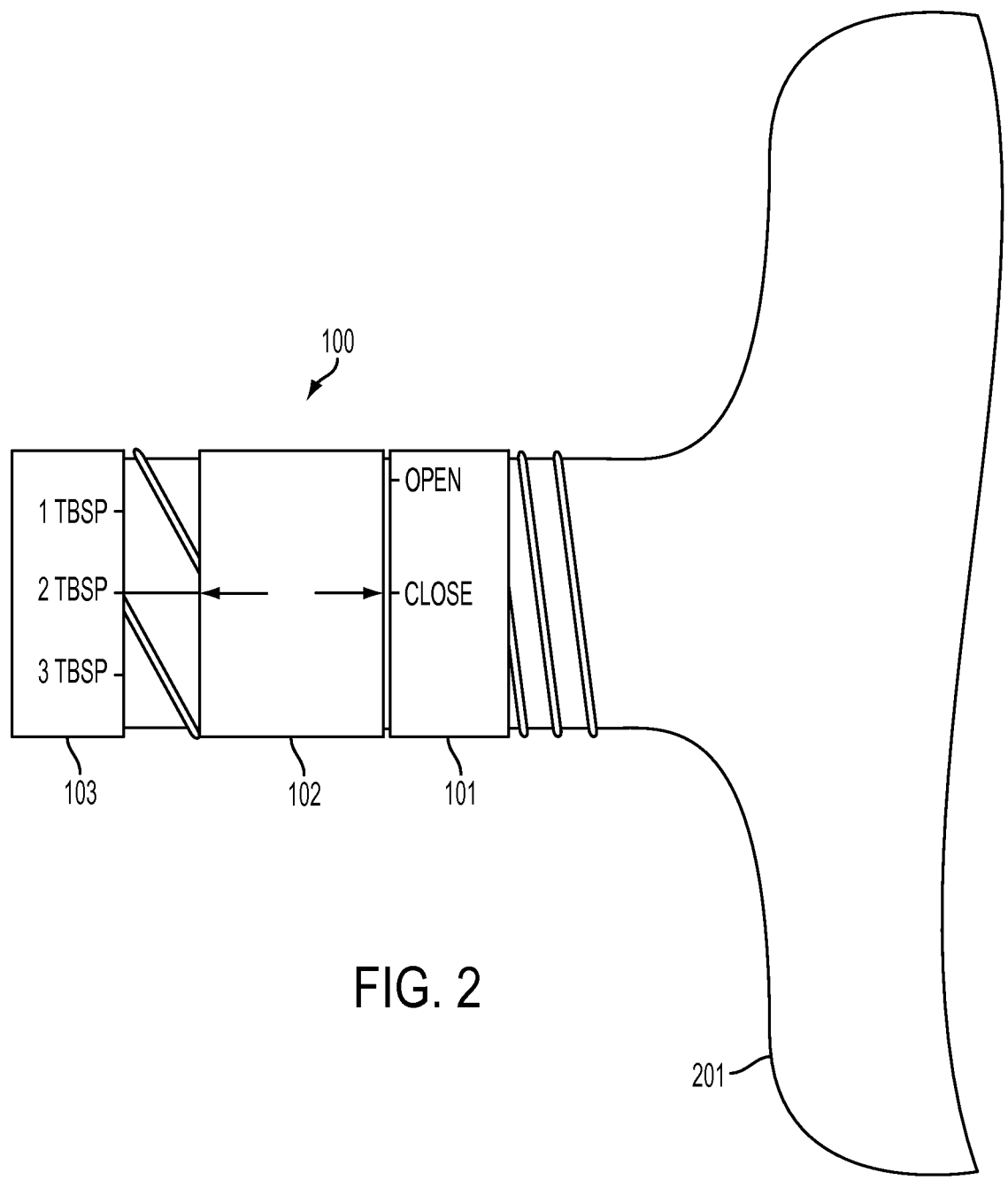
FIG. 2 is a view of the dispenser attached to a bottle, according to an exemplary embodiment of the present invention.

FIG. 2 is a view of the dispenser (100) attached to a bottle (201), according to an exemplary embodiment of the present invention. As shown in FIG. 2, the dispenser (100) may be attached to the bottle (201) by screwing on via matched threading on the neck of the bottle and the inside surface of the first conduit section (101).

Figure 3:
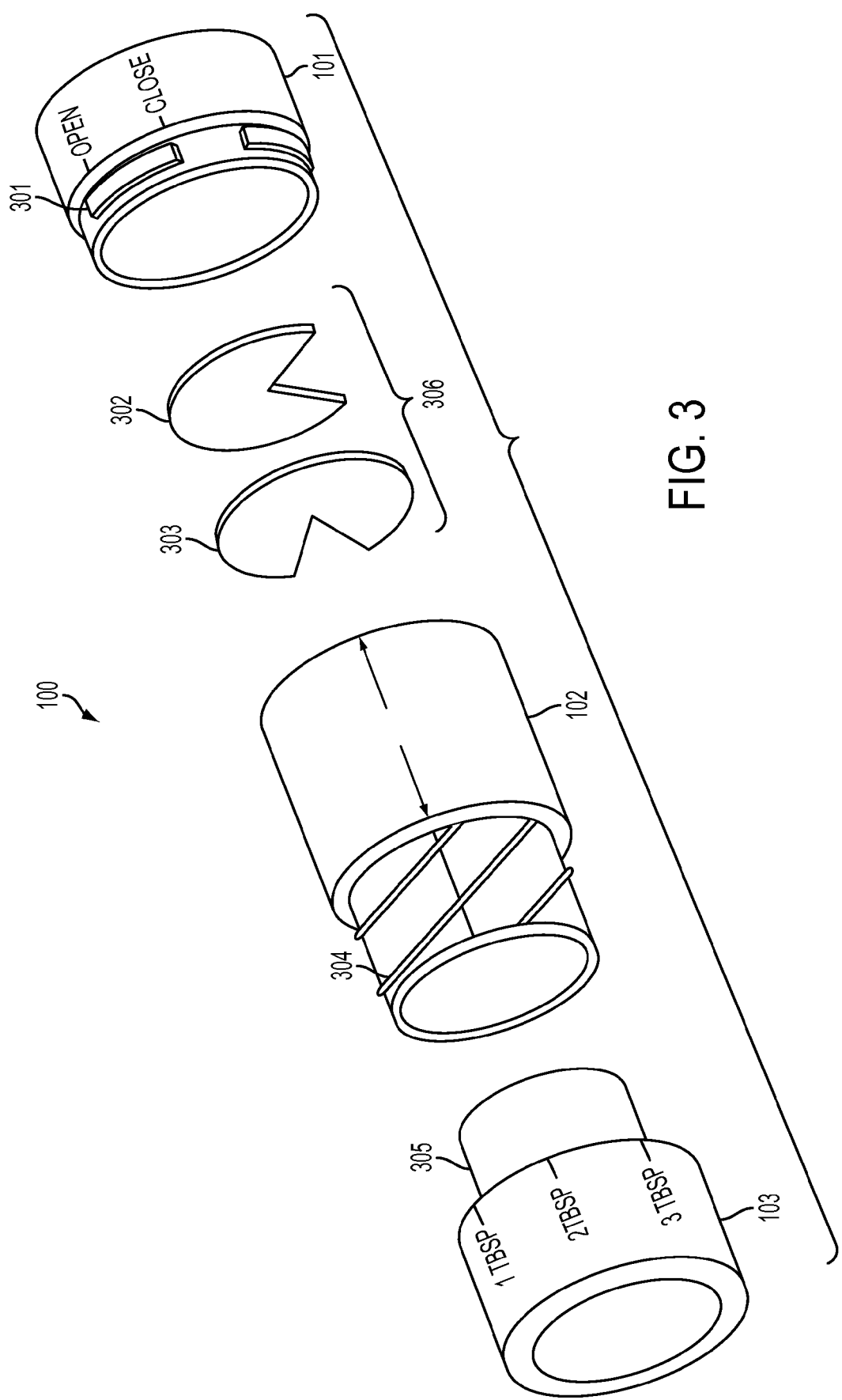
FIG. 3 is an exploded view of the dispenser, according to an exemplary embodiment of the present invention.

FIG. 3 is an exploded view of the dispenser (100), according to an exemplary embodiment of the present invention. As shown in FIG. 3, a valve (306) may be positioned in an interior portion of the dispenser (100) between sections of the first conduit section (101) and the second conduit section (102), to control a flow of the substance between the first conduit section (101) and the second conduit section (102). In an exemplary embodiment of the present invention, the valve (306) may be opened and closed by rotating the second conduit section (102) relative to the first conduit section (101).

Figure 8:
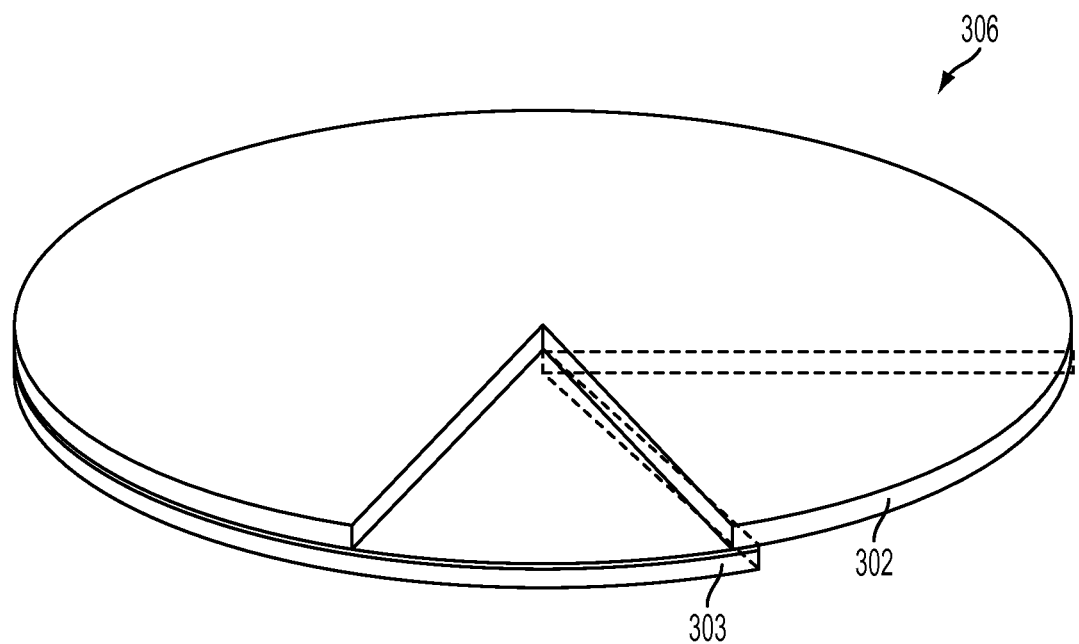
FIG. 8 is a view of a valve of the dispenser in closed position, according to an exemplary embodiment of the present invention.
Figure 9:
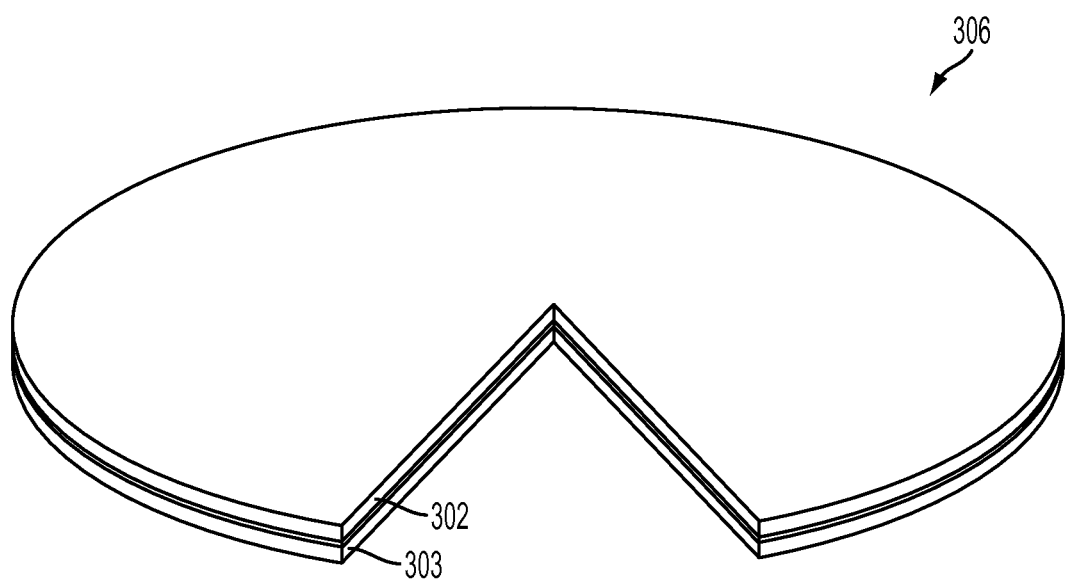
FIG. 9 is a view of the valve of the dispenser in open position, according to an exemplary embodiment of the present invention.

The valve (306) may include a first disc (302) and a second disc (303). The first disc (302) and the second disc (303) each include a cutout notch, and the first disc (302) and the second disc (303) are stacked upon each other. The first disc (302) may be rotatable relative to the second disc (303), such that when the cutout notches of the first disc (302) and the second disc (303) are not aligned as shown in FIG. 8, the valve (306) is closed. Also, when the cutout notch of the first disc (302) is aligned with the cutout notch of the second disc (303) as shown in FIG. 9, the valve (306) is open.

The cutout notch of the first disc (302) and the cutout notch second disc (303) may each encompass an area of up to about 50% of the respective disc. The cutout notches should be of a size that is sufficient to allow the substance to pass through when the cutout notches of the discs are aligned.

Figure 6:
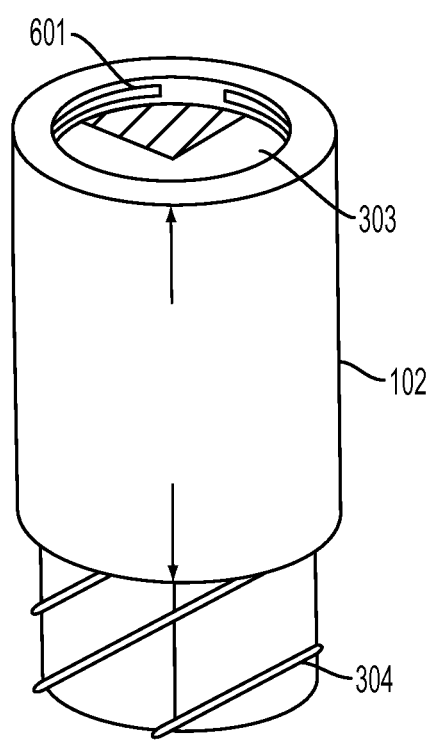
FIG. 6 is a view of a second conduit section of the dispenser, according to an exemplary embodiment of the present invention.
Figure 7:
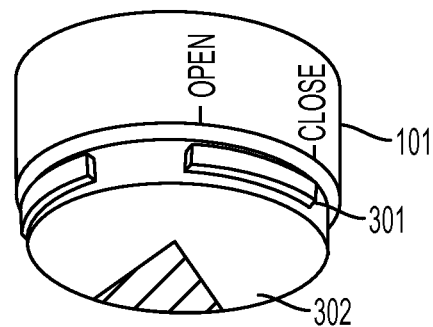
FIG. 7 is a view of a third conduit section of the dispenser, according to an exemplary embodiment of the present invention.

The first disc (302) may be fixed in relation to the first conduit section (101) as shown in FIG. 7, such that the first disc (302) partially seals an end of the first conduit section (101) and also rotates together with the first conduit section (101). The second disc (303) may be fixed in relation to the second conduit section (102) as shown in FIG. 6, such that the second disc (303) partially seals an end of the second conduit section (102) and also rotates together with the second conduit section (102). However, the valve (306) may also be opened and closed independently of any rotation of the second conduit section (102) in relation to the first conduit section (101).

The first conduit section (101) may include a notch (301) (shown in FIG. 3) that slides within a groove (601) of the second conduit section (102) (shown in FIG. 6). When the end part of the first conduit section (101) having the notch (301) is inserted within the end part of the second conduit section (102) having the groove (601), the notch (301) fits within the groove (601) to keep the first conduit section (101) and the second conduit section (102) attached together. According to an exemplary embodiment of the present invention, the length of the groove (601) preferably is longer than the length of the notch (301) to allow for confined and limited rotation of the first conduit section (101) with respect to the second conduit section (102). This rotation is limited in either rotation direction based on the points at which the notch (301) abuts each respective end of the groove (601), such that the notch (301) can move within the length of the groove (601). This configuration allows the second conduit section (102) to rotate relative to the first conduit section (101), where at one end of the rotation the cutout notch of the first disc (302) is aligned with the cutout notch of the second disc (303) and the valve (306) is open as shown in FIG. 9, and at the other end of the rotation the cutout notch of the first disc (302) is not aligned completely with the cutout notch of the second disc (303) and the valve (306) is closed as shown in FIG. 8.

According to an exemplary embodiment of the present invention, the first conduit section (101) may include a plurality of notches (301) and the second conduit section (102) may include a plurality of grooves (601), whereby each notch (301) corresponds to and fits within a respective groove (601).

Figure 4:
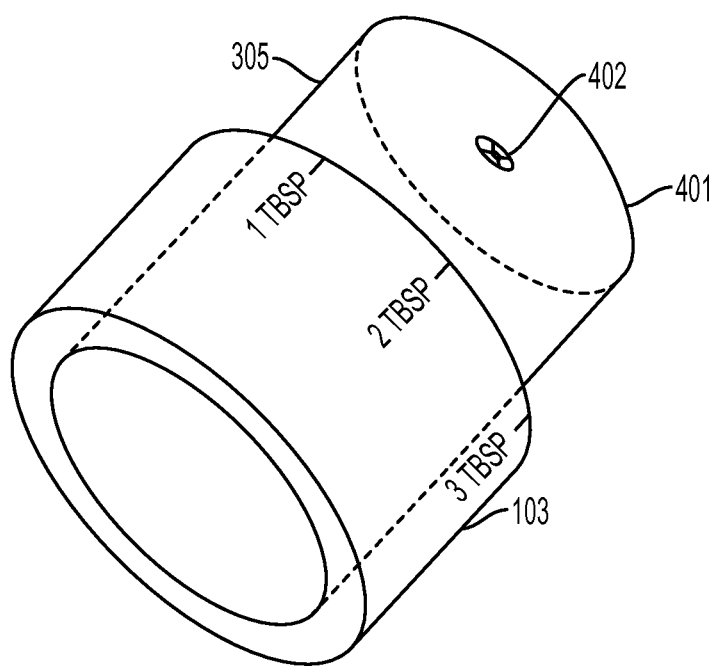
FIG. 4 is a view of a first conduit section of the dispenser, according to an exemplary embodiment of the present invention.
Figure 5:
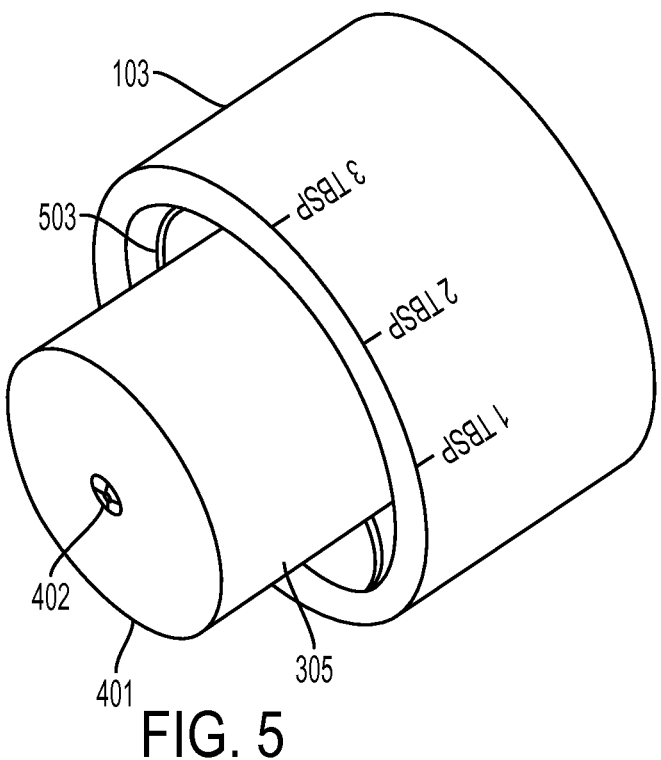
FIG. 5 is another view of the first conduit section of the dispenser, according to an exemplary embodiment of the present invention.

As shown in FIG. 3, the second conduit section (102) of the dispenser (100) may include a threading (304) that couples with a corresponding track (503) of the third conduit section (103) (shown in FIG. 5). When the third conduit section (103) is coupled together with the second conduit section (102), an inner tube (305) of the third conduit section (103) is inserted within the second conduit section (102). At a top end of the inner tube (305) is a plunger (401) having a spout (402), as shown in FIGS. 4 and 5. The threading (304) and track (503)

allow the third conduit section (103) to rotate relative to the second conduit section (102) in a manner such that the depth of penetration of the plunger (401) into the second conduit section (102) is changed when the third conduit section (103) is rotated relative to the second conduit section (102). The plunger (401) may have a flat disc shape or may be formed to have a conical profile.

A measuring chamber of the dispenser (100) is formed from the internal space of the second conduit section (102) and is capped at one end by the valve (306) and at the other end by the plunger (401). The volume of the measuring chamber is adjustable by changing the depth of penetration of the plunger (401) into the second conduit section (102). The dispenser (100) may be marked with a scale indicator to indicate the volume of the measuring chamber. For example, the third conduit section (103) may have tablespoon scale markings to indicate a volume to which the measuring chamber of the dispenser (100) is currently set.

Several coupling configurations of the second conduit section (102) with the third conduit section (103) may be possible while still allowing the volume of the measuring chamber to be adjustable by changing the depth of penetration of the plunger (401) into the second conduit section (102). For example, in another exemplary embodiment of the present invention, instead of coupling a rotational threading (304) of the second conduit section (102) with a corresponding track (503) of the third conduit section (103), the third conduit section (103) may be configured to simply slide straight into and out from the second conduit section (102) without requiring a rotation of the third conduit section (103) in relation to the second conduit section (102). In this configuration, the volume of the measuring chamber is reduced when the plunger (401) is pushed further into the second conduit section (102) towards the valve (306), and the volume of the measuring chamber is increased when the plunger (401) is pulled further apart from the valve (306). The second conduit section (102) may have tablespoon scale markings based upon the depth of penetration of the plunger (401) into the second conduit section (102), to indicate a volume to which the measuring chamber of the dispenser (100) is currently set.

According to an exemplary embodiment of the present invention, the second conduit section (102) may be of a transparent material such as a clear plastic, resin or glass. This allows the measuring chamber and its contents to be seen, and also allows for more easy determination as to whether the measuring chamber is completely filled with the substance.

In order to maintain a tight seal to prevent leakage of the substance and seepage between adjoining surfaces of the sections of the dispenser (100), a material such as rubber or silicon may be used. For example, an O-ring, gasket or sealing ring made of rubber, silicon or other material may be added to an outer rim of the plunger (401) to abut an inner circumference of the second conduit section (102). The plunger (401) may smoothly slide within the second conduit section (102) while maintaining a seal against the inner surfaces of the second conduit section (102) to prevent leakage of the substance maintained within the measuring chamber. Furthermore, an O-ring, gasket or sealing ring made of rubber, silicon or other material may be added between the adjoining portions of the first conduit section (101) and the second conduit section (102), and may also be added between the moving parts of the valve (306) such as between the first disc (302) and the second disc (303), to prevent undesired leakage or seepage of the substance.

To set a dispensing amount of the dispenser (100), the depth of penetration of the plunger (401) into the second conduit section (102) is adjusted until the desired volume is indicated by the scale indicator markings. As discussed above, the depth of penetration of the plunger (401) may be adjusted simply by pushing the plunger (401) deeper into the second conduit section (102), or by rotating the third conduit section (103) relative to the second conduit section (102). After the desired dispensing amount is set and the valve (306) has also been set to the open position as shown in FIG. 9, in which the second conduit section (102) is in a rotation position relative to the first conduit section (101) so as to align the cutout notch of the first disc (302) with the cutout notch of the second disc (303), the measuring chamber can be filled with the desired amount of the substance. In the open position, the valve (306) allows the substance to be transferred from the bottle (201) and into the measuring chamber within the second conduit section (102). The dispenser (100) may be tilted in a position that utilizes gravity to allow the substance to fall into the second conduit section (102) with or without additional assistance added by shaking the dispenser (100).

When the measuring chamber of the second conduit section (102) is full of the substance, the valve (306) is set to the closed position as shown in FIG. 8. This may be accomplished by placing the second conduit section (102) in a rotation position relative to the first conduit section (101) so as to completely misalign the cutout notch of the first disc (302) and the cutout notch of the second disc (303). The closed valve (306) prevents the substance from travelling back into the bottle (201) from the measuring chamber of the second conduit section (102), and also prevents more substance from entering the measuring chamber. The desired amount of the substance is now maintained within the measuring chamber of the second conduit section (102) and is ready for dispensing.

To dispense the substance from the dispenser (100), the plunger (401) may be forced deeper into the second conduit section (102) and towards the second disc (303) of the valve (306), thus collapsing the volume of the measuring chamber. As discussed above, the depth of penetration of the plunger (401) may be adjusted by rotating or sliding the third conduit section (103) relative to the second conduit section (102).

As the volume of the measuring chamber is collapsed by the plunger (401), the pressure generated by the plunger (401) forces the substance out of the measuring chamber through the spout (402) of the plunger (401). The ejected substance passes through the hollow of the third conduit section (103) and is discharged out and away from the dispenser (100) and onto food or any desired object. The substance may be a condiment, dressing, seasoning or other edible ingredient, but is not limited thereto. The amount of substance that is ejected from the dispenser (100) by collapsing the measuring chamber by the plunger (401) is the same volume as the desired volume of the measuring chamber as indicated by the scale indicator markings that was set as the dispensing amount. Accordingly, it is possible to accurately measure and easily dispense a desired amount of the substance from the bottle (201).

According to an exemplary embodiment of the present invention, the spout (402) may be a circular opening that is partially covered by a membrane having at least one slit. When the plunger (401) generates pressure within the measuring chamber, the membrane separates at the slit(s) as a result of the pressure and allows the substance to pass through and out of the measuring chamber. The release of the substance from the measuring chamber through the spout (402) also releases the generated pressure, and the membrane and slit(s) spring back to their original position to block passage of the substance. The membrane having the slit(s) is sufficiently resilient that it does not bend unless the applied pressure exceeds a hydraulic static head pressure generated by the measuring chamber full of the substance.

In another exemplary embodiment of the present invention, the substance may be released from the measuring chamber through an opening of the plunger (401) that is larger than the spout (402). For example, the plunger (401) may include a hatch (not shown) which when opened creates the opening of the plunger (401) through which the substance can be released from the measuring chamber. The hatch may be a hinged cover, a sliding cover, or other type of cover which allows the substance to pass through the opening when the hatch is displaced from the opening.

Although the dispenser (100) has been shown in FIGS. 1-4 as being marked with 1 TBSP, 2 TBSP, 3 TBSP scale indicators on the third conduit section (103), this tablespoon scale has been given as a non-limiting example only. The measuring chamber of the dispenser (100) may be configured to be larger or smaller than that shown in the non-limiting example, and the scale markings on the third conduit section (103) indicating the volume of the measuring chamber would change based on the size of the adjustable volume measuring chamber.

Accordingly, it is now possible to accurately measure and easily dispense a desired amount of the substance from the bottle (201), as shown by exemplary embodiments of the present invention.

The foregoing exemplary embodiments and advantages are merely exemplary and are not to be construed as limiting the present invention. The present teaching can be readily applied to other types of apparatuses. Also, the description of exemplary embodiments of the present invention is intended to be illustrative, and not to limit the scope of the claims, and many alternatives, modifications, and variations will be apparent to those skilled in the art.

What is claimed is:

1. A dispenser for dispensing a substance, the dispenser comprising:
 a measuring chamber having an adjustable volume for receiving the substance substantially in a predetermined amount through a valve;
 a conduit section that adjusts the volume of said measuring chamber by moving a plunger that forms a wall of said measuring chamber,
  wherein said valve can selectively seal the substance within said measuring chamber, and said plunger comprises a spout through which the substance can be dispensed as said plunger is moved by said conduit section into said measuring chamber to reduce the volume of said measuring chamber,
  wherein said valve can be closed by rotating said measuring chamber relative to a container from which the substance is received,
  wherein said measuring chamber is rotated relative to the container to effectuate a rotation of a first disc of said valve relative to a second disc of said valve, said second disc being concentric with and stacked upon said first disc, and each of said first disc and said second disc having a cutout portion, wherein said valve can be closed when a non-cutout portion of said first disc overlaps and covers said cutout portion of said second disc to form a barrier seal, and
  wherein said first disc of said valve is fixed so as to not be rotatable relative to said measuring chamber, and said second disc of said valve is fixed so as to not be rotatable relative to the container when the dispenser is attached to the container; and
 a container-connecting conduit section comprising a notch that slides within a groove of said measuring chamber,
  wherein when an end part of said container-connecting conduit section having said notch is inserted within an end part of said measuring chamber having said groove, said notch fits within said groove to keep said container-connecting conduit section and said measuring chamber attached together,
  wherein a length of said groove is longer than a length of said notch so as to allow for confined and limited rotation of said container-connecting conduit section with respect to said measuring chamber,
  wherein the rotation of said container-connecting conduit section with respect to said measuring chamber is limited in clockwise and counter-clockwise rotation directions based on points at which said notch abuts each respective end of said groove, such that said notch can move within said length of said groove,
  wherein said measuring chamber is allowed to rotate relative to said container-connecting conduit section, whereby at one end of the rotation said cutout portion of said first disc is aligned with said cutout portion of said second disc and said valve is open, and whereby at another end of the rotation said non-cutout portion of said first disc overlaps and completely covers said cutout portion of said second disc and said valve is closed, and
  wherein said plunger comprising said spout is provided along a same axis as said measuring chamber, said conduit section and said container-connecting conduit section.

2. The dispenser of claim 1, wherein a rotation of said conduit section relative to said measuring chamber changes a position of said plunger and changes the volume of said measuring chamber.

3. The dispenser of claim 1, wherein said conduit section comprises markings that reflect the adjustment in the volume of said measuring chamber based on the position of said plunger.

4. A dispenser, comprising:
 a first conduit section having a first end for coupling to an opening of a container;
 a second conduit section having a first end for coupling to a second end of said first conduit section, said second conduit section having a measuring chamber for receiving substantially a predetermined amount of substance from the container;
 a valve that controls a flow of the substance between the container and said measuring chamber; and
 a third conduit section for coupling to a second end of said second conduit section,
  wherein a volume of said measuring chamber is adjusted by changing a depth of penetration of a plunger of said third conduit section into said second conduit section,
  wherein said valve can be selectively opened or closed by rotating said second conduit section relative to said first conduit section,
  wherein said valve comprises a first disc and a second disc, said second disc being concentric with and stacked upon said first disc, and each of said first disc and said second disc having a cutout portion, wherein said valve can be closed when said first disc is rotated to a position in which a non-cutout portion of said first disc overlaps and covers said cutout portion of said second disc to form a barrier seal,
  wherein said first disc of said valve is fixed so as to not be rotatable relative to said second conduit section, and said second disc of said valve is fixed so as to not be rotatable relative to said first conduit section, wherein said first conduit section comprises a notch that slides within a groove of said second conduit section, wherein when an end part of said first conduit section having said notch is inserted within an end part of said second conduit section having said groove, said notch fits within said groove to keep said first conduit section and said second conduit section attached together, wherein a length of said groove is longer than a length of said notch so as to allow for confined and limited rotation of said first conduit section with respect to said second conduit section, wherein the rotation of said first conduit section with respect to said second conduit section is limited in clockwise and counter-clockwise rotation directions based on points at which said notch abuts each respective end of said groove, such that said notch can move within said length of said groove, wherein said second conduit section is allowed to rotate relative to said first conduit section, whereby at one end of the rotation said cutout portion of said first disc is aligned with said cutout portion of said second disc and said valve is open, and whereby at another end of the rotation said non-cutout portion of said first disc overlaps and completely covers said cutout portion of said second disc and said valve is closed, and wherein said first conduit section, said second conduit section, said valve, and said third conduit section are all provided along a same axis.

5. The dispenser of claim 4, wherein said depth of penetration of said plunger can be changed by rotating said third conduit section relative to said second conduit section.

6. The dispenser of claim 4, wherein said depth of penetration of said plunger can be changed by sliding said third conduit section towards or away from said second conduit section.

7. The dispenser of claim 4, wherein said third conduit section comprises a spout through which the substance contained in said measuring chamber is dispensed.

8. The dispenser of claim 7, wherein the substance can be dispensed from said measuring chamber through said spout as the volume of said measuring chamber is reduced by said plunger.

9. The dispenser of claim 4, wherein the substance can be dispensed from said measuring chamber through an opening of said third conduit section after a hatch that selectively covers said opening is displaced from said opening.

10. The dispenser of claim 4, further comprising scale markings that indicate the volume of said measuring chamber based on said depth of penetration of said plunger into said second conduit section.

11. A method of dispensing a measured amount of a substance from a container, the method comprising:
adjusting a volume of a measuring chamber to a desired volume;
filling said measuring chamber with the substance;
closing a valve to prevent flow of the substance into and out from said measuring chamber; and
dispensing the substance from said measuring chamber,
wherein said closing said valve comprises rotating said measuring chamber relative to the container,
wherein said rotating said measuring chamber relative to the container effectuates a rotation of a first disc of said valve relative to a second disc of said valve, said second disc being concentric with and stacked upon said first disc, and each of said first disc and said second disc having a cutout portion, wherein said valve can be closed when a non-cutout portion of said first disc overlaps and covers said cutout portion of said second disc to form a barrier seal, wherein said first disc of said valve is fixed so as to not be rotatable relative to said measuring chamber, and said second disc of said valve is fixed so as to not be rotatable relative to the container, wherein said closing said valve further comprises rotating said measuring chamber relative to the container such that a notch of a container-connecting conduit section connected to the container slides within a groove of said measuring chamber, wherein when an end part of said container-connecting conduit section having said notch is inserted within an end part of said measuring chamber having said groove, said notch fits within said groove to keep said container-connecting conduit section and said measuring chamber attached together, wherein a length of said groove is longer than a length of said notch so as to allow for confined and limited rotation of said container-connecting conduit section with respect to said measuring chamber, wherein the rotation of said container-connecting conduit section with respect to said measuring chamber is limited in clockwise and counter-clockwise rotation directions based on points at which said notch abuts each respective end of said groove, such that said notch can move within said length of said groove, wherein said measuring chamber is allowed to rotate relative to said container-connecting conduit section, whereby at one end of the rotation said cutout portion of said first disc is aligned with said cutout portion of said second disc and said valve is open, and whereby at another end of the rotation said non-cutout portion of said first disc overlaps and completely covers said cutout portion of said second disc and said valve is closed, and wherein said measuring chamber is provided along a same axis as said valve and said container-connecting conduit section.

12. The method of claim 11, wherein the substance can be dispensed from said measuring chamber by forcing the substance through a spout.

13. The method of claim 11, wherein said dispensing the substance from said measuring chamber comprises:
reducing the volume of said measuring chamber with a plunger; and
forcing the substance to dispense from said measuring chamber through a spout passing through said plunger.

14. The method of claim 13, wherein the volume of said measuring chamber is reduced by moving said plunger toward said valve.

15. The method of claim 11, wherein the substance is dispensed from said measuring chamber by opening a hatch of said measuring chamber and releasing the substance through said opened hatch.

16. The method of claim 11, wherein said filling said measuring chamber with the substance comprises passing the substance from the container to said measuring chamber through said valve.

17. The method of claim 11, wherein said closing said valve comprises rotating a disc of said valve to a position that seals an opening in said valve between said measuring chamber and the container.

18. The dispenser of claim 4, wherein said second disc of said valve is fixed so as to not be rotatable relative to the container when the dispenser is attached to the container by said first conduit section.

\* \* \* \* \*